ELECTRONIC PULSE CODER

Filed Nov. 14, 1952

INVENTOR.
JENUS L. DUNN
BY Theodore C. Wood
AGENT
Wade Koontz
ATTORNEY

United States Patent Office 2,978,695

Patented Apr. 4, 1961

2,978,695

ELECTRONIC PULSE CODER

Jenus L. Dunn, North Tonawanda, N.Y., assignor to the United States of America as represented by the Secretary of the Air Force Filed Nov. 14, 1952, Ser. No. 320,506

2 Claims. (Cl. 340—359)

This invention relates to pulse coding circuits and more particularly to that type of pulse coding circuit wherein a signal applied to one input of the circuit will produce three pulses in the output, and when a signal is applied to another input of the circuit two signals will appear in the output.

In certain types of remote control systems, it is desirable that the control signals be coded in such a manner that the signals will be readily distinguished one from the other.

It is an object of this invention to provide a pulse coding circuit wherein input signals will produce in the output circuit signals which are readily distinguished from each other.

It is another object of this invention to provide a circuit which will produce in its output a plurality of pulses spaced in time which pulses will represent a particular input signal and furthermore the time spacing between the pulses may be made uniform.

Figure 1:
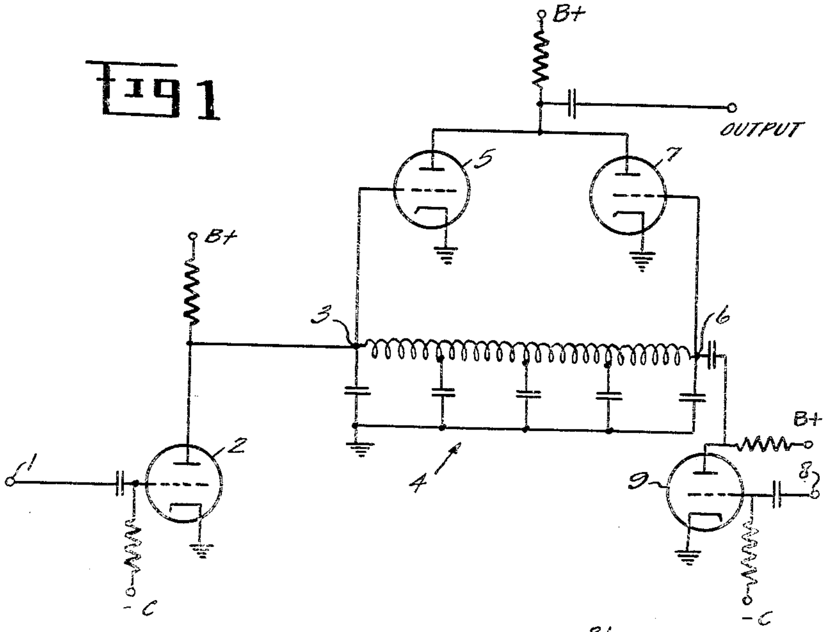

The above objects, as well as other objects, features and advantages of this invention will be more readily understood in view of the following description when taken in conjunction with the drawing wherein Fig. 1 is a schematic diagram of one embodiment of a pulse coding circuit constructed in accordance with the principles of this invention.

Figure 2:
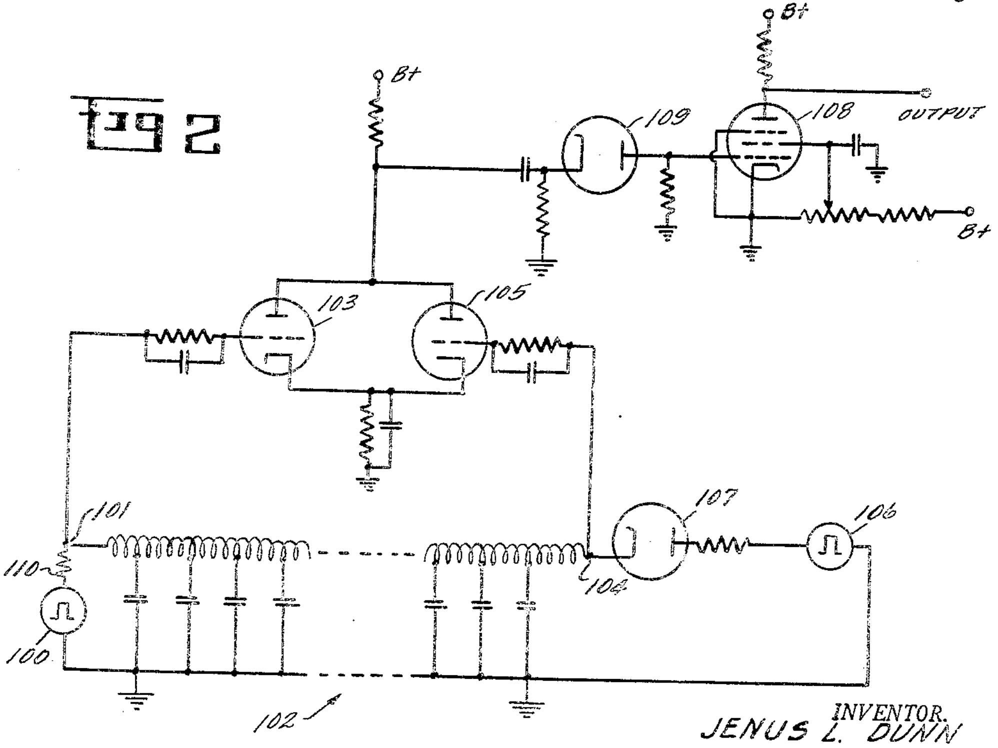

Fig. 2 is a schematic diagram of another pulse coding circuit constructed in accordance with the principles of this invention.

Referring now to Fig. 1, a first source of pulses which is to be coded has its output applied to terminal 1. Tube 2 has its control grid connected to terminal 1 and the remainder ot its associated circuit is so arranged that the output of tube 2 produces negative pulses in response to positive pulses being applied to terminal 1. The output of this tube is applied to terminal 3 of delay line 4 and to the control grid of tube 5. The load resistance of tube 2 is made equal to the characteristic impedance of delay line 4. Terminal 6 of delay line 4 is connected to the control grid of tube 7 so that negative pulses applied to terminal 3 of the delay line will be impressed upon the control grid of tube 7 a predetermined length of time later. The amount of delay being dependent upon the delay characteristics of delay line 4.

A second source of input signals has its output applied to terminal 8. Tube 9 has its control grid connected to terminal 8 and tube 9 has the remainder of its circuits so arranged that the output of that circuit will be negative pulses and these negative pulses are applied to terminal 6 of delay line 4 as well as to the control grid of tube 7. The load resistance of tube 9 has such a value that it is very large as compared to the characteristic impedance of delay line 4.

Assume a single positive pulse is delivered to input terminal 1. This positive pulse is inverted in output of tube 2 and appears at the control grid of tube 5, plate current is cut off in tube 5 resulting in a positive pulse in the output circuit of tube 5. The negative pulse output of tube 2 is also impressed upon the input terminal 3 of delay line 4. This negative pulse travels down the delay line and appears at the control grid of tube 7 resulting in the second positive pulse in the output circuit. The only terminating resistance at the right hand end of the delay line is the load resistance of tube 9. Since that load resistance is much greater than the characteristic impedance of the delay line, the pulse is reflected and travels back down the line and appears again on the control grid of tube 5 as a negative pulse. This results in the third positive pulse in the output circuit of tube 5. Since the load resistance of tube 2 is made equal to the characteristic impedance of the delay line, all of the energy in the pulse is dissipated and no more reflection occurs in the line.

Assume a single positive pulse is applied to input terminal 8. A negative pulse will appear in its plate circuit and that negative pulse will be applied to the control grid of tube 7 resulting in a positive pulse in the output circuit. The negative pulse is also impressed across the terminal 6 of delay line 4. That negative pulse travels to the left in the delay line and upon arriving at the control grid of tube 5 it will cause a second positive output pulse. Since the load resistance of tube 2 is equal to the characteristic impedance of the delay line, all of the energy in the pulse is dissipated and no reflection will occur.

From the above description it will be apparent that when a single pulse is applied to terminal 1, three pulses spaced in time will appear in the output circuit, however, when a single pulse is applied to input terminal 8 two pulses spaced in time will appear in the output circuit.

Another pulse coding circuit constructed in accordance with the principles of this invention is shown in Fig. 2, reference being made thereto. A first source of positive pulses 100 has its output connected to terminal 101 of delay line 102 and also to the control grid of tube 103. Terminal 104 of delay line 102 is connected to the control grid of tube 105. A second source of input pulses 106 has its output connected to terminal 104 of delay line 102 through a rectifier 107. Tubes 103 and 105 have a common anode-cathode circuit and the output of that circuit is applied to the control grid of tube 108 through a rectifier 109. Tube 108 is of the sharp cut off type wherein the anode-cathode current will be cut off by even the smallest negative pulse of the input pulses.

Assume a single positive pulse is applied to terminal 101 from the pulse source 100. That positive pulse will be impressed upon the control grid of tube 103 resulting in a negative pulse in the output circuit of tubes 103 and 105. That positive pulse applied to terminal 101 also travels down the delay line 102 and arrives at the control grid of tube 105 a predetermined time thereafter, the delay time being dependent upon the delay characteristic of the delay line 102. This positive pulse on the control grid of tube 105 will result in a second negative pulse in the output circuit of tubes 103 and 105. Since rectifier 107 is poled in the manner shown in the drawing, it will present an open circuit to the positive pulse which also traveled down the delay line, and therefore since the delay line is unterminated, that positive pulse is reflected back from terminal 104 to terminal 101 of the delay line 102 and results in another positive pulse being applied to the control grid of tube 103, resulting in a third negative pulse in the output circuit of tubes 103 and 105. Since the internal impedance 110 of pulse source 100 is made equal to the characteristic impedance of the delay line 102, the pulse which was reflected in the delay line is completely dissipated and no further reflections of that pulse will occur.

Assume now a single positive pulse is generated by a pulse source 106. Since rectifier 107 is poled in the manner shown in the drawing, this positive pulse will be applied to terminal 104 of the delay line, and will also be applied to the control grid of tube 105 resulting in a negative pulse in the output circuit of tubes 103 and 105. That positive pulse also travels down the delay line 102 and a predetermined time thereafter will arrive at terminal 101 of the delay line 102 and will be impressed upon the control grid of tube 103 resulting in a second negative pulse in the output circuit of tubes 103 and 105. Since as was previously described the internal impedance 110 is equal to the characteristic impedance of the delay line 102, that pulse will be dissipated and no reflection of that pulse in the delay line will occur.

Due to the attenuating in the delay line, these negative pulses in the output circuit of tubes 103 and 105 will not in general be of the same amplitude and some positive overshoot of these pulses will occur. The rectifier 109 will clip the overshoot and since these negative pulses are applied to the control grid of tube 108, which has a sharp cut off characteristic, all of the negative pulses in the output circuit of tubes 103 and 105 will appear as positive pulses in the output circuit of tube 108 with substantially equal amplitude.

Although particular preferred embodiments of this invention have been illustrated and described, that illustration and description is merely for the purpose of more clearly explaining the principles of the invention and are not to be construed as limiting, since many additions, omissions and modifications may be made without departing from the scope of this invention.

What is claimed is:

1. An electronic pulse coder comprising a first electron discharge device and a second electron discharge device each having at least an anode, a cathode and a control grid; a common anode-cathode circuit for said first electron discharge device and said second electron discharge device; a first source of input pulses; a second source of input pulses; a pulse delay line having a first pair of terminals at one end thereof and a second pair of terminals at the other end thereof; means connecting said first source of input pulses between the terminals constituting said first pair and also between the grid and cathode of said first electron discharge device; means connecting said second source of input pulses between the terminals constituting said second pair and also between the grid and cathode of said second electron discharge device; the internal impedance of said first source as seen from said first pair of terminals being equal to the characteristic impedance of said line and the internal impedance of said second source as seen from said second pair of terminals being high compared to the characteristic impedance of said line.

2. An electronic pulse coder comprising a first electron discharge device and a second electron discharge device each having at least an anode, a cathode and a control grid; a common anode-cathode circuit for said first electron discharge device and said second electron discharge device; a first source of input pulses; a pulse delay line having a first pair of terminals at one end thereof and a second pair of terminals at the other end thereof; means to apply pulses from said first source of input pulses between the control grid and cathode of said first electron discharge device and also between the terminals constituting said first pair of terminals of said pulse delay line, the internal impedance of said first source as seen from said first pair of terminals being equal to the characteristic impedance of said line; means to apply pulses from said second pair of terminals of said pulse delay line between said control grid and cathode of said second electron discharge device; a second source of input pulses and means to apply pulses from said second source of input pulses between said control grid and cathode of said second electron discharge device and also between the terminals constituting said second pair of terminals of said pulse delay line; said last named means including a unidirectional conducting device so poled that it will conduct pulses from said second source of input pulses to said control grid of second electron discharge device and to said second pair of terminals of said pulse delay line and will act as a high impedance to pulses from said first source of input pulses whereby a single pulse from said first source of input pulses will produce three pulses spaced in time in said common anode-cathode circuit and a single pulse from said second source of input pulses will produce two pulses spaced in time in said common anode-cathode circuit.

References Cited in the file of this patent

UNITED STATES PATENTS

| | | |
|---|---|---|
| 2,266,154 | Blümlein | Dec. 16, 1941 |
| 2,579,497 | Isbister | Dec. 25, 1951 |